(12) United States Patent
Sohn

(10) Patent No.: US 6,896,367 B1
(45) Date of Patent: May 24, 2005

(54) ASSEMBLY STRUCTURE OF RIMLESS EYEGLASSES

(75) Inventor: Chung Be Sohn, Taegu (KR)

(73) Assignee: Eureka Co., Ltd., Taegu (KR)

( * ) Notice: Subject to any disclaimer, the term of this patent is extended or adjusted under 35 U.S.C. 154(b) by 0 days.

(21) Appl. No.: 10/770,610

(22) Filed: Feb. 3, 2004

(51) Int. Cl.$^7$ ................................................ G02C 1/02
(52) U.S. Cl. ...................................................... 351/110
(58) Field of Search ........................... 351/110, 140–152

(56) References Cited

U.S. PATENT DOCUMENTS 6,808,261 B1 * 10/2004 Park ............................ 351/110
2003/0071962 A1 * 4/2003 Nishihara .................... 351/110

* cited by examiner

Primary Examiner—Huy Mai

(74) Attorney, Agent, or Firm—Park & Sutton LLP; John K. Park

(57) ABSTRACT

Disclosed is an assembly structure of rimless eyeglasses capable of ensuring fixing between lenses and a bridge, and fixing between the lenses and temple connectors with no gap, and of minimizing break of the lenses by shock. The assembly structure of rimless eyeglasses for assembling the bridge and the temple connectors to the lenses includes: locking pin slits and bolt holes formed in the lenses; locking pins and bolts formed on the bridge and the temple connectors, the locking pins and the bolts being inserted and fit into the locking pin slits and the bolt holes of the lenses; support pads respectively having two holes and being fit on the locking pins and the bolts through the holes thereof to hold the locking pins and the bolts integrally; and nuts being fit and fastened to the bolts.

2 Claims, 3 Drawing Sheets

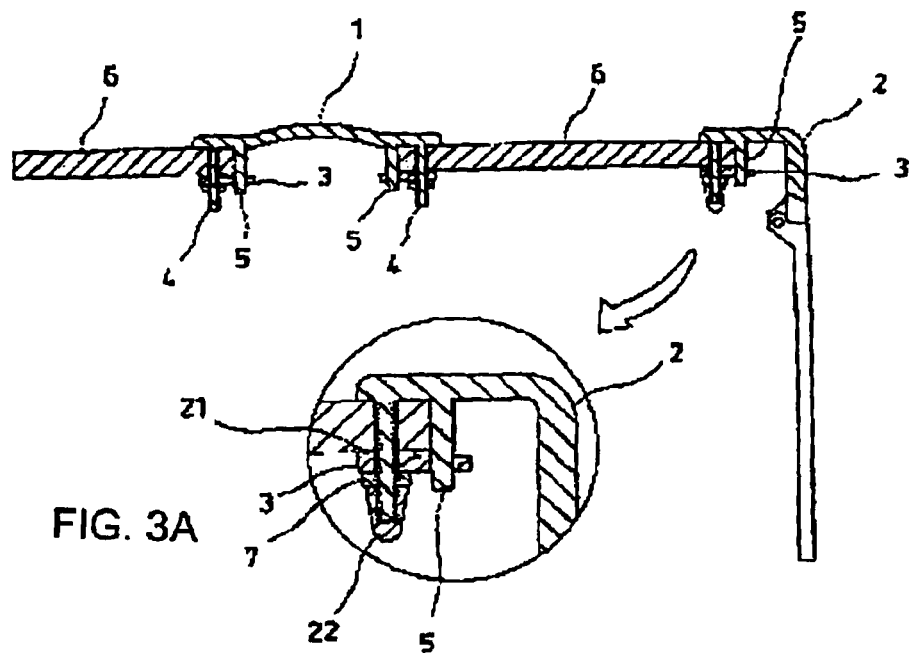
FIG. 3
FIG. 3A
PRIOR ART
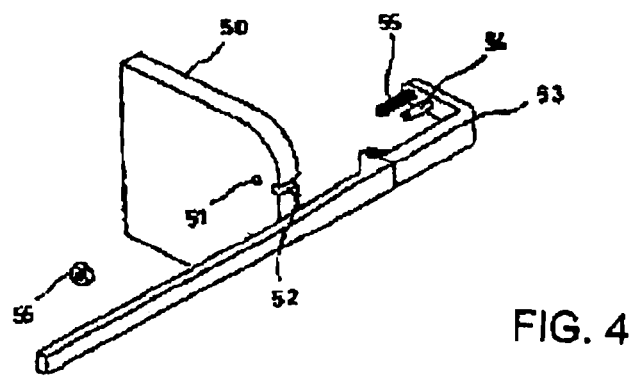
FIG. 4

ASSEMBLY STRUCTURE OF RIMLESS EYEGLASSES

BACKGROUND OF THE INVENTION

1. Field of the Invention

The present invention relates to an assembly structure of rimless eyeglasses, and more particularly, to an assembly structure of rimless eyeglasses capable of ensuring fixing between lenses and a bridge, and fixing between the lenses and temple connectors with no gap, and of minimizing break of the lenses by shock.

2. Background of the Related Art

Rimless eyeglasses are gradually increasing in consumers' preference, as being light, providing an excellent wearing feeling to a wearer and being recognized as an ideal eyeglasses for expressing the contour of the wearer's face.

The rimless eyeglasses of various assembly structures have been developed. One of the conventional assembly structures of the rimless eyeglasses, as shown in FIG. 4, includes a bolt hole 51 and a locking slit 52 formed in a lens 50, locking pins 54 and bolts 55 mounted on a bridge (not shown) and temple connectors 53, wherein the locking pin 54 is inserted and fit into the locking slit 52 and the bolt 55 is inserted and fit into the bolt hole 51, and then, a nut 56 is fit onto the bolt 55 for tightly assembling.

Such rimless eyeglasses has an advantage in that they provide a natural wearing feeling and are lighter as the bridge and the temple connectors 53 are directly assembled to the lenses 50.

However, the rimless eyeglasses, of which the bridge and the temple connectors are assembled to the lenses 50 only by the bolts 55 and nuts 56, cannot provide stronger fastening force as fastening force is concentrated around the bolts and the lenses 50 may be cracked when the nuts are fixed excessively strong.

The locking pin 54 locked to the locking slit 52 of the lens 50 has no fastening force and cannot prevent back and forth movement of the lens while providing a function for preventing up and down movement of the lens, and so, the bridge and the temple connectors fixed to the lenses cannot keep a stably assembled condition.

Therefore, the conventional rimless eyeglasses have a disadvantage in that the nuts must be frequently tightened as the nuts are loosened well from the bolts during use.

Furthermore, when the nuts are kept in the loosened condition for a long time, the bridge and temple hinge parts are gradually loosened from the lenses and moved from the bolt holes and the locking slits of the lenses little by little, and finally, the lenses may be broken. Moreover, the conventional rimless eyeglasses have another disadvantage in that the wearer has to repair the eyeglasses at an eyeglasses shop due to loss of nuts.

Particularly, when the lenses are shocked from the front, as described above, the lenses can be easily broken due to concentration of the shock around the bolts 55, the nuts 56 and the bolt holes 51 fixing the lenses 50 as the locking pin 54 cannot prevent the back and forth movement of the lenses 50.

SUMMARY OF THE INVENTION

Accordingly, the present invention is directed to an assembly structure of rimless eyeglasses that substantially obviates one or more problems due to limitations and disadvantages of the related art. An object of the present invention is to provide an assembly structure of rimless eyeglasses, which can fix nuts to lenses stably and firmly by securing stability when a bridge and temple connectors are assembled to the lenses, thereby preventing loosening of the bridge and the temple connectors from the lenses and solving the problem of the conventional rimless eyeglasses in that a wearer must tightens the nuts at any time.

Another object of the present invention is to provide an assembly structure of rimless eyeglasses, which can increase durability of lens connection portions during the front shock by preventing back and forth movement of the lenses, thereby providing improved quality.

To achieve these objects and other advantages and in accordance with the purpose of the invention, as embodied and broadly described herein, the assembly structure of rimless eyeglasses, which have a bridge for connecting two lenses, and temple connectors for connecting temples to the lenses, comprises: locking pins and bolts for fastening nuts, which are integrally formed; and support pads respectively having two holes to be fit onto the bolts and the nuts for assembling and fixing the lenses.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 1 and 1A are perspective views of essential parts according to the present invention;

FIGS. 3 and 3A are sectional views of the essential parts according to the present invention; and FIG. 4 is an exploded perspective view of an assembly structure of conventional rimless eyeglasses.

DETAILED DESCRIPTION OF THE PREFERRED EMBODIMENT

Reference will now be made in detail to the preferred embodiments of the present invention, examples of which are illustrated in the accompanying drawings.

Figure 1:
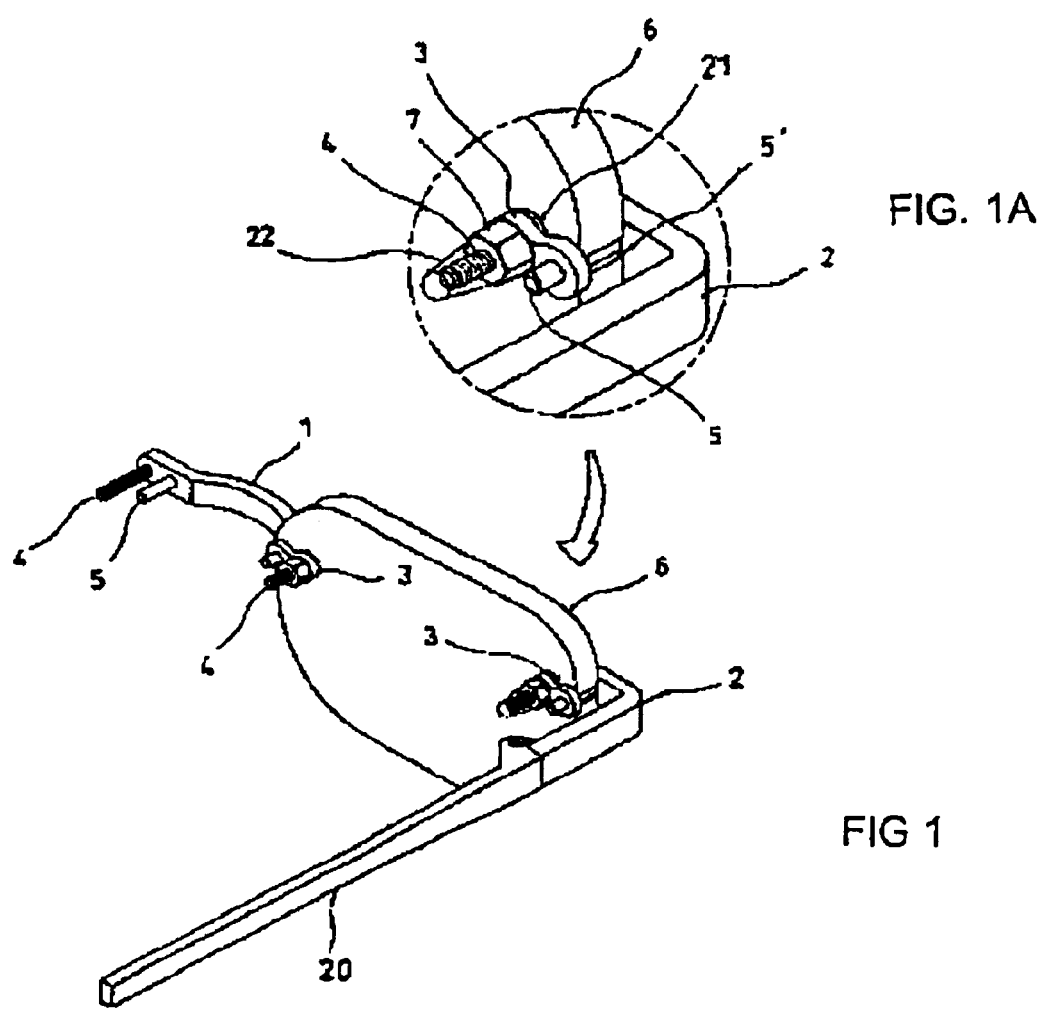
Figure 2:
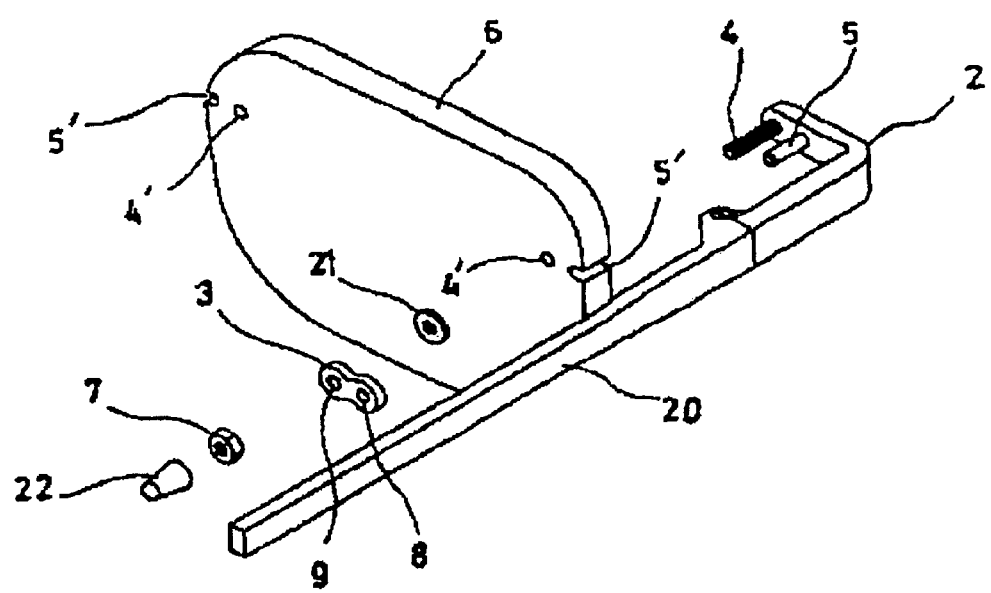
FIG. 2 is an exploded perspective view of the essential parts according to the present invention.

FIG. 1 is perspective view of essential parts according to the present invention, FIG. 2 is an exploded perspective view of the essential parts, and FIG. 3 is a sectional view of the essential parts according to the present invention.

As shown in FIGS. 1, 1a and 2, locking pins 5 and bolts 4 for fastening nuts 7 are formed integrally with a bridge 1 for connecting and assembling two lenses 6 and with temple connectors 2 for connecting and assembling temples to the lenses 6.

Support pads 3, in each of which two holes 8 and 9 are formed, are provided for stabling fastening of the locking pins 5 and the bolts 4. The lens 6 has locking pin slits 5' and bolt holes 4' for inserting and fastening the locking pins 5 and the bolts 4 formed integrally with the bridge 1 and the temple connectors 2.

In the above condition, the locking pins 5 and the bolts 4 formed on the bridge 1 and the temple connectors 2 are inserted into the locking pin slits 5' and the bolt holes 4' formed in the lenses 6, and then, the holes 8 and 9 of the support pads 3 are fit onto the locking pins 5 and the bolts 4, so that the support pads 3 make the lenses 6, the locking pins 5 and the bolts 4 be integrated together. After that, the nuts 7 are fit onto the bolts 4.

In the drawings, unexplained reference numeral 20 designates a temple, 21 designates a synthetic resin washer, and 22 designates a bolt cover.

Functions of the assembly structure of rimless eyeglasses according to the present invention will be described in more detail as follows.

As shown in FIGS. 3 and 3a, the bridge 1 is connected between the lenses 6 having the locking pin slits 5' and the bolt holes 4', and the temple connectors 2 are connected at both sides of the lenses 6 for connecting the temples 20. The locking pins 5 and the bolts 4, which are respectively formed on the bridge 1 and the temple connectors 2, go through the locking pin slits 5' and the bolt holes 4' of the lenses 5, and then, are coupled with the synthetic resin washers 21. As the support pads 3 are positioned at the locking pins 5 and the bolts 4 through the holes 8 and 9 thereof, pressurizing force is evenly dispersed by the support pads 3 even though the nuts 7 are fastened to the bolts 4 very firmly, and so, excessive pressure is not caused around the locking pin slits 5' and the bolt holes 4' formed in the lenses 6.

Therefore, even though the nuts 7 are fastened more firmly, the lenses 6 are not broken, so that the fixing between the lenses and the bridge 1 and the fixing between the lenses 6 and the temple connectors 2 can be made stably and firmly.

Particularly, as the support pads 3 can pull the locking pins 5 and the bolts 4 together, the present invention provides an effect of fastening two bolts and two nuts using one bolt and one nut, thereby fastening the lenses very firmly in a wide area. As a result, the present invention can increase durability to the front shock applied to the lenses as dispersing the front shock around the locking pin slits 5' and the bolt holes 4' of the lenses.

As described above, the assembly structure of rimless eyeglasses according to the present invention can disperse pressurizing force evenly and fasten the nuts firmly as the support pads are positioned to the locking pins and the bolts of the bridge and the temple connectors through the holes thereof and the nuts are fastened to the bolts, thereby ensuring the fixing between the lenses and the bridge and the fixing between the lenses and the temple connectors with no gap. Particularly, as the support pads 3 can pull the locking pins 5 and the bolts 4 together, the present invention provides an effect of fastening two bolts and two nuts using one bolt and one nut, thereby increasing durability of the lenses to the front shock, and increasing reliability of the rimless eyeglasses by preventing the back and forth movement of the lenses.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An assembly structure of rimless eyeglasses for assembling a bridge and temple connectors to lenses, the assembly structure of rimless eyeglasses comprising:

locking pin slits and bolt holes formed in the lenses;

locking pins and bolts formed on the bridge and the temple connectors, the locking pins and the bolts being inserted and fit into the locking pin slits and the bolt holes of the lenses;

support pads respectively having two holes and being fit on the locking pins and the bolts through the holes thereof to hold the locking pins and the bolts integrally; and nuts being fit and fastened to the bolts.

2. The assembly structure of rimless eyeglasses according to claim 1, further comprising synthetic resin washers, each of the synthetic resin washers being interposed between the lens and the support pad for ensuring fixing between the bolt and the nut.

\* \* \* \* \*